United States Patent Office 3,476,713
Patented Nov. 4, 1969

3,476,713
COLORIMETRIC INDICATOR CONTROL OF POLYAMIDE SALT STOICHIOMETRY
James C. Dorsey, Chattanooga, Tenn., assignor to E. I. du Pont de Nemours and Company, Wilmington, Del., a corporation of Delaware
No Drawing. Filed Mar. 13, 1967, Ser. No. 622,393
Int. Cl. C08g 20/20
U.S. Cl. 260—78
4 Claims

ABSTRACT OF THE DISCLOSURE

Imbalance of the components of a diammonium salt of a dicarboxylic acid and a diamine (useful for polymerizing to form a polyamine) is cured by adding an acid-base indicator to a solution of a sample of the salt, observing the absorbence values of each of the acid and base forms of the said indicator spectrophotometrically to determine the "indicator value" of the sample solution, referring the said indicator value to the predetermined relationship of indicator value and salt imbalance to determine the extent of imbalance of the original salt solution, and thereafter adding additional dicarboxylic acid or diamine whenever appropriate to correct the said imbalance, and finally polymerizing the said salt to a fiber-forming stage.

BACKGROUND OF THE INVENTION

Field of the invention

The invention relates to a process for preparing a polyamide and more specifically to a process for curing the imbalance of a polyamide-forming salt.

Description of the prior art

The preparation of fiber-forming polycarbonamides by polymerization of a dicarboxylic acid and a diamine requires careful regulation of the molecular proportions of the reactants. U.S. Patent 2,130,948 describes a method whereby the diammonium salt which is first formed from the diamine and the dicarboxylic acid (using a pH meter to determine the point of exact equivalency or molecular proportion) is precipitated, isolated, and then subjected to polymerization. The precipitated salt usually contains the diacid and the diamine in almost exact molecular proportion. U.S. 2,163,584 describes a procedure whereby a pH meter is used to determine the point of equivalency of the diammonium salt in aqueous solution and thereafter polymerizing the salt without intermediate isolation. U.S. 2,840,547 describes a process whereby the molecular proportions of the ingredients are balanced in the absence of additional water as indicated by the pH analysis of an aqueous solution of a low molecular weight polymer formed by mixing the molten reactants.

The last two processes are normally preferred over the others for their simplicity. Unfortunately, their utility is limited generally to those processes where the diammonium salt is water soluble. Effectiveness of the salt-balance analysis is greatly reduced and in some cases inadequate when alcohol-water mixtures or non-aqueous solvents are necessary to obtain a sufficiency concentrated solution of the salt for electrometric pH analysis.

STATEMENT OF THE INVENTION

This invention provides a process for the preparation of a synthetic, linear, fiber-forming polycarbonamide which comprises mixing in solution as reactant components (1) a dicarboxylic acid and (2) a diammonium salt-forming diamine, adjusting the proportion of said diamine to said dicarboxylic acid by addition of one of said components so that a ratio of the spectrophotometric absorption peak value of the acid or base form of an acid-base indicator to the sum of the said peak values, in a solution of a sample of the mixed components gives a predetermined value and thereafter melt polymerizing the mixture to the fiber-forming stage. The specific steps of the process comprise (1) adding together substantially equimolecular quantities of a diamine and a dicarboxylic acid in a solvent to form a solution of a diammonium salt, (2) adding an acid-base indicator to a small sample of the salt in solution, (3) determining the I.V. (i.e., indicator value) of the solution by spectrophotometrically observing the sample to determine the absorption peak values of each of the acid and the base form of the indicator, the I.V. being the ratio of one of the said peak values to the sum of both peak values, (4) correcting salt imbalance to provide a desired accurate proportion of diamine to dicarboxylic acid in the solution, where necessary, by adding a quantity of the appropriate member of the class consisting of the diamine and the di-acid, the quantity of diamine or di-acid being determined in accordance with a predetermined relationship of I.V. and salt imbalance for the particular diammonium salt system and (5) thereafter polymerizing the resulting diammonium salt. A preferred form of the invention is the above process wherein the analyzed solution of the polycarbonamide-forming diammonium salt and the acid-base indicator is substantially non-aqueous and said salt is water-insoluble.

DEFINITIONS

The following examples are cited to illustrate the invention. They are not intended to limit it in any manner. As used in the examples, "substantially non-aqueous" means that less than 50% by weight of the solvent medium is water; "water-insoluble" means that the diammonium salt is less than 1% by weight soluble in water at 25° C.

Example 1.—Obtaining I.V. of Balanced Salt; Using the I.V. to Balance a Salt Solution of PACM–12

Molecularly balanced salts of substantially pure trans-trans, cis-trans and cis-cis bis(4-aminocyclohexyl)methane (hereafter referred to as PACM) with dodecanedioic acid are prepared by mixing the reactants in methanol solution and recrystallization of the precipitated salt from methanol. A 2% solution (on a weight/volume basis) of each of the dried salts is prepared in a 1:1 mixture of ethylene glycol/methanol by volume, to which about 0.5 ml. of 0.04% by weight aqueous solution of Phenol Red (sodium salt) indicator is added. Solution absorbence (A) is measured in 5 cm. cells at wave lengths of 565 and 430 millimicrons using a Beckman DK spectrophotometer, these being the known wave lengths for the peak values of this particular indicator. The absorbence at 650 millimicrons, a wave length well removed from the peak values, is also observed and is subtracted from those at 565 and 430 millimicrons as a base-line correction. The Indicator Value for each salt, calculated from the formula $$\mathrm{I.V.} = \frac{A_{565}}{A_{565} + A_{430}}$$

is found to be:

trans-trans=0.316
cis-trans=0.301
cis-cis=0.302

The Indicator Value for a mixed isomer salt can be calculated by summation of the individual isomer contributions. Thus, for example, for a salt containing 70% trans-trans, 25% cis-trans and 5% cis-cis PACM isomer levels the Indicator Value is:

$(0.70 \times 0.316) + (0.25 \times 0.301)$
$+ (0.05 \times 0.302) = 0.312$ I.V.

The composition of the glycol-alcohol solvent is not permitted to vary more than ±1% of either ingredient. In the region 1-2% concentration, water in the solvent is found to give a 1% increase in Indicator Value for each 1% increase in the amount of water present in the solution. Hence, the water level in the solvent must be carefully controlled (a variation of about ±5% water in the original salt sample can be tolerated because of the dilution effect in preparation of the sample solution). The 2% salt solution is not allowed to vary more than ±0.05%. The temperature is controlled to 25.0±0.05° C.

The relationship between I.V. and molecular imbalance can be determined by measuring the I.V. of a substantially neutral salt, of a sample containing a measured excess diamine and another sample containing a measured excess of dodecanedioic acid and then plotting the results. For 70 tt. PACM values of 0.326 for the substantially neutral salt, 0.379 for a solution containing 1 mol excess diamine and 0.273 for a solution containing 1 mol excess dodecanedioic acid are obtained. Plotting Indicator Value vs. percent molar imbalance gives a straight line relationship having as slope of 0.050 where slope ($m$) is:

$$m = \frac{\Delta \text{ I.V.}}{\Delta \text{ Molar percent balance}}$$

Knowing this relationship and the I.V. of the dry, molecularly balanced salt, an I.V. can be calculated which is required for a given salt to give the desired molecular balance in polymer prepared from the salt. For the 70 tt. salt using a wet salt sample whose composition is 38% water and 62% dry salt, a correction factor in I.V. is calculated for the wet salt as follows:

Percent water (in sample solution) × (0.01 × 0.312) = Δ I.V. (As described above for the effect of water concentration in the analyzed salt sample on I.V.) or $$1.22\% \times 0.01 \times 0.312 = +0.004 = \Delta \text{ I.V.}$$

From previous experience it is known that polymerization of the sampled, concentrated salt solution results in a 0.4% loss in diamine under the particular polymerization conditions to be used. Compensation for this loss necessitates increasing the I.V. of the initial salt by:

$$\Delta \text{ I.V.} = 0.4 \times 0.05 = +0.020$$

Experience shows that removal of the hot sample under atmospheric conditions (where it had been at 140° C. and 40 p.s.i.g.) for I.V. determination results in a loss of diamine from the sample corresponding to a Δ I.V. = −0.006.

Summing the above the values the I.V. correction required to produce a balanced polymer is as follows:

$$0.312 + 0.004 + 0.020 - 0.006 = 0.330 = \text{Desired I.V.}$$

The Indicator Value for a salt solution consisting of 55% by weight of the salt of PACM containing 7% of the trans-trans isomer and dodecanedioic acid in water maintained at 140° C. and 40 p.s.i. is observed to be 0.338. (Sampling the hot solution under atmospheric pressure results in a loss of water to give a wet salt sample whose composition is about 38% water and 62% dry which corresponds to the water correction conditions shown above.) Since the desired I.V. value for a balanced salt is 0.330, the observed I.V. indicates an I.V. imbalance of 0.008, corresponding to about 0.16 mol percent excess of diamine (0.008/0.05 = 0.16). The total weight of the salt solution is 1750 lbs. containing 960 lbs. of the salt, of which 502 lbs. is the weight of the dicarboxylic acid. The amount of acid to be added to lower the I.V. to 0.330 as desired is calculated as follows:

Δ I.V. × 0.20 × (weight of acid present) = weight of acid needed or 0.008 × 0.20 × 502 = 0.8 lbs. to be added.

To the pressurized aqueous salt solution is added 0.75 lb. of dodecanedioic acid by actual measurement. Analysis of the correceted aqueous salt solution gives an Indicator Value of 0.330, as desired. This solution is then concentrated by evaporation of water to approximately 65% by weight of salt, transferred into an autoclave equipped with spiral-ribbon agitator and melt polymerized in a conventional manner at a temperature about 285° C. under autogeneous pressure and then increased to about 315° C. while the pressure is decreased to atmospheric over a period of about 90 minutes. The polymerization proceeds further by heating at about 315° C. under an inert gas sweep (2.0 cubic feet per minute). The polymer is then extruded, quenched and cut into flake. The polymer has a carboxyl end analysis of 42.5 equivalents per million grams of polymer and 41.8 amine end equivalents and a relative viscosity of 93.4 in a 1:1 mixture by weight of 98% formic acid and phenol at 25° C. (3.700 g. polymer in 50 ml. solvent).

Repetition of the above process for regulating polymer composition shows that the process enables regulation of the molecular balance within the polymer within ±0.01 mol percent.

When the experiment is repeated except that the I.V. is adjusted to 0.365 (about 0.70 mol percent excess of diamino) the resulting polymer has a carboxyl end analysis of 30 equivalents per million grams of polymer, 63 amine end equivalents, and a relative viscosity at 25° C. in a 1:1 mixture by volume of 98% formic acid and phenol of 87.6.

Example 2.—Water Soluble Polycarbonamides; "I.V." vs. "pH" Techniques

A 9.5 percent by weight salt solution (500 ml.) is prepared and adjusted to the equivalency point using a pH meter. The solution is then divided into 100 ml. aliquots. Additional, carefully measured quantities of diamine and diacid are added to give solutions of the following degrees of diamine imbalance expressed in mol percent: −1.0, −0.5, 0.0, +0.5, and +1.0. The pH of each solution at 25° C. is determined to the nearest 0.01 pH unit in the usual mannner using a potentiometric pH meter.

After the pH determination, 10. 525 ml. of each solution is transferred to 50 ml. volumetric flasks. The indicator, 0.50 ml. of a 0.02 percent by weight water solution of Phenol Red-sodium salt, and 15 ml. reagent grade methanol are added to each flask and the solution diluted to 50 ml. with distilled water. The Indicator Value of each solution is determined at 25° C. using the procedure described in Example 1.

The purpose of the methanol addition is to decrease the rate of change in Indicator Value with respect to the salt imbalance and expand the range of salt imbalance over which the determination provides a useful value. Although this decreases the sensitivity of the determination, the resulting sensitivity is still greater than that provided by the potentiometric pH method of 0.01 unit sensitivity. Conversely, without addition of the methanol, greater sensitivity can be attained but with some sacrifice in range of salt balance over which the Indicator Value method is useful. This versatility in altering sensitivity and range of the salt-balance determination results from the high degree of sensitivity of this process.

Table I shows the change in I.V. equivalent to a change of 0.01 pH unit in the region of −0.25 to +0.25 mole percent of diamine imbalance for the salts tested.

Table I

| Salts Ingredients: | Change in I.V. per 0.01 pH Unit |
|---|---|
| (1) Hexamethylene diamine adipic acid | 0.0022 |
| (2) Hexamethylene diamine sebacic acid | 0.0022 |
| (3) Hexamethylene diamine cyclohexane-1,4-dicarboxylic acid | 0.0021 |
| (4) 1,3 - diaminocyclohexane cyclohexane-1,4-dicarboxylic acid* | 0.0027 |
| (5) 1,4-b-is(aminomethyl) cyclohexane suberic acid | 0.0025 |

*No methanol added because equivalence point is sufficiently weak that it spans the range of salt imbalance tested.

In each case the change in I.V. per 0.01 pH unit is greater than 0.002; i.e., at least four times greater than the limit of sensitivity of the I.V. determination which is about 0.0008 unit.

Using the above salts adjusted to the desired molecular balance as shown by the I.V., and carefully controlled conventional melt polycondensation processes for polymerization of the salts, high-molecular weight polycarbonamides having the desired balance of end-groups within narrow limits can be prepared.

SUITABLE POLYCARBONAMIDES

The process of this invention is applicable to the preparation of synthetic, linear, fiber-forming polycarbonamides having carbonamide linkages as an integral part of the polymer chain. Such polymers are commonly referred to as nylon. It is applicable when said polycarbonamides are prepared from their corresponding diammonium salts of the diamine and the dicarboxylic acid. It is particularly advantageous when said salts are water insoluble. Typical of such water-insoluble salts are those of PACM containing at least 50 percent by weight of the trans-trans isomer and linear aliphatic dicarboxylic acids containing 10 or more carbon atoms. The method is also applicable to the preparation of copolymers from mixtures of diamines and/or dicarboxylic acids in the salt.

SUITABLE INDICATORS

The primary consideration in selecting an acid-base indicator for use in the process of this invention is that it must go through its color change in the region of interest, i.e., the region of essentially exact chemical equivalency between the diamine and the dicarboxylic acid (e.g., normally 6.5-8.5 pH). Another requirement is that both the acid and the base forms of the indicator must give clearly defined absorption peaks as determined by conventional spectrophotometric analysis. Preferably both peaks should be located within the range of wave length absorption of 400 millimicron to 700 millimicron which permits the use of a photomultiplier detection system. Phenol Red is an example of such a preferred indicator. Brom Thymol Blue is another suitable indicaotr covering the preferred pH range but it requires a lead sulffide detector system for determining peak absorption most accuately. Usually the photomultiplier detection system is preferred for its greater sensitivity.

Indicators are known having one absorption peak in the visible and the other in the ultraviolet light region; these peaks must be measured using tungsten and hydrogen lamp sources respectively, and can be used but are not normally suited for the most precise work.

Obviously the indicator's chemical stability and purity must be sufficiently high to insure reproducibility over a period of time and under the conditions of the analysis. The indicator must be compatible with and soluble in the solvent system.

SUITABLE SOLVENT SYSTEMS

The usual considerations apply in selecting a suitable solvent for determining the Indicator Value. The solvent must dissolve the diammonium salt in reasonable concentration for the analysis and have sufficiently high dielectric constant to solvate the polar functional groups and thereby give sufficient sensitivity to the salt imbalance. Where applicable, water is preferred. Alcohols may be used but with less sensitivity due to less polarization and a lower dielectric constant. Generally, ethylene glycol provides better sensitivity than alcohols but frequently salt solubility is limited. Consequently, mixed solvents are sometimes necessary to get the desired balance of solvent properties. Sensitivity and reproducibility of the method will vary according to solvent composition; accordingly mixed solvent compositions should not vary more than ±1% of any ingredient for reproducible results.

A preferred solvent mixture for water-insoluble diammonium salts is a 1:1 mixture by volume of ethylene glycol and methanol. At lower methanol contents, the solubility of the salt is diminished but a slight improvement in sensitivity can be gained as a result of a slight increase in dielectric constant. Another non-aqueous system which has given good results with this method is a 4:1 ratio by volume of ethylene glycol and methylene chloride.

Where applicable, i.e., when a water soluble salt is used, water is normally preferred since it will increase the dissociation of the acid, resulting in a higher hydrogen ion concentration as compared, for example, to alcohols or other organic solvents. Likewise, the indicator dissociation will be affected by water and the presence of water will thereby change the Indicator Value in other solvents. For example, in using the ethylene glycol/methanol solvent mentioned above, a 1% increase in Indicator Value using Phenol Red results from a 1% increase in the amount of water present (at the 1-2% level). Thus, water content in other solvents must be closely regulated to give consistent results.

OTHER VARIABLES

Salt concentration in the test solution on which the I.V. is measured is highly important. A 2% by weight concentration usually gives satisfactory results and should not vary more than ±0.05% for reproducible results. Also, measurements must be made under constant temperature conditions.

BALANCING THE SALT

For a given diammonium salt, the Indicator Value can be related to mole percent salt imbalance for a known series of diamine and dicarboxylic acid molecular mixtures. A plot of the Indicator Value vs. mol percent imbalance, in the region of the point of exact equivalency, is an essentially straight line relationship. From such a relationship can be determined the amount of dicarboxylic acid which must be added to a given quantity of salt to adjust the molecular proportion to the desired balance. It is obvious that the desired degree of molecular balance in the salt will depend upon processing and polymerization variables, as well as the desired balance in the final polymer. For example, consideration must be made for ingredients which may be lost through volatilization during the polymerization. For this reason one or the other of the salt components may be desired in slight excess in the salt in order to give the desired balance in the final polymer.

CONTINUOUS OPERATION

The process of this invention may be used in both batch and continuous polymerization processing. The process may be arranged so that salt composition is continuously monitored and adjusted automatically. For instance, knowing the constants involved and the desired salt balance, and operating with an excess of one salt ingredient in the initial solution, addition of the other ingredient as required (to the solution or the polymerization vessel) may be controlled automatically through a pump whose rate is regulated by an input coupled to the spectrophotometer employed to read the absorption peaks of the sample indicator salt solution. After correction to the desired composition, the polymerization is carried to completion.

ADDITIVES

It is within the scope of this invention to include in the polymerizable salt solutions conventional additives for incorporation into the polymer such as antioxidants, pigments, dyes, fillers and other modifying agents which may be present during the polymerization.

PROCESS ADVANTAGES

A major advantage in this process lies in the use of the absorption peaks of both the acid and the base forms of the indicator. By relating a ratio of these absorption peaks to the molecular proportion of the diamine and dicarboxylic acid the method is independent of concentration of the indicator in the test solution. This simplifies preparation of the solution to be analyzed, resulting in greater accuracy and reproducibility where maximum precision is desired. Furthermore this method does not rely on the careful determination of an absolute value but is rather concerned with a highly reproducible relationship between peak absorbency ratios and molecular imbalance. Thus, measurement conditions are much less demanding than the prior art methods of pH meters or measurement of a single indicator absorbence peak to precisely determine acidity in a given solvent system.

Production of products having a highly uniform composition is important in the manufacture of synthetic textile fibers. Relatively small variations in polymer composition can result in inconsistent results in customer processing, e.g., dyeing. This invention provides a highly versatile process for the production of a broad class of synthetic, linear, fiber-forming polycarbonamides of highly uniform composition.

Many equivalent modifications will become apparent to those skilled in the art from a reading of the above without a departure from the inventive concept.

What is claimed is:

1. A process for the preparation of a synthetic linear fiber forming polycarbonamide which comprises reacting in aqueous medium, substantially equimolecular quantities of (1) an aliphatic dicarboxylic acid and (2) a diammonium salt-forming aliphatic diamine to form at a temperature above 100° C., an aqueous solution of a diammonium salt which is water insoluble at temperatures up to about 100° C., removing a sample of salt from the solution and redissolving the same in a substantially nonaqueous solvent, adding an acid-base indicator of the class of brom thymol blue and the sodium salt of phenol red thereto, determining the ratio of the spectrophotometric absorption peak value of the acid or base form of said acid-base indicator to the sum of the said peak values in the sample, changing the proportion of the diamine to the dicarboxylic acid in the aqueous salt solution by the addition of one of said components so that the said ratio is equal to a predetermined value and thereafter melt polymerizing the salt to the fiber-forming stage.

2. The process of claim 1 wherein the said dicarboxylic acid is dodecanedioic acid and the said diamine is bis(4-aminocyclohexyl)methane.

3. The process of claim 2 wherein the said indicator is the sodium salt of phenol red.

4. The process of claim 2 wherein the said indicator is brom thymol blue.

References Cited

UNITED STATES PATENTS

| | | | |
|---|---|---|---|
| 2,130,947 | 9/1938 | Carothers | 260—78 |
| 2,158,064 | 5/1939 | Carothers | 260—78 |
| 2,163,584 | 6/1939 | Carothers | 260—78 |
| 2,840,547 | 6/1958 | Stump | 260—78 |

HAROLD D. ANDERSON, Primary Examiner

U.S. Cl. X.R.

260—95, 501.2